Patented Jan. 19, 1943

2,308,848

UNITED STATES PATENT OFFICE 2,308,848

TREATMENT OF FATS AND OILS

Harland H. Young and Howard C. Black, Chicago, Ill., assignors to Industrial Patents Corporation, Chicago, Ill., a corporation of Delaware No Drawing. Application April 14, 1939,
Serial No. 267,906

15 Claims. (Cl. 260—398.5)

This invention relates to a method of treating revertible oleaginous materials.

One of the objects of this invention is to provide a method of treating revertible oleaginous materials to prevent flavor and odor reversion.

Other objects of this invention will become apparent from the description and claims which follow.

Certain animal, marine, and vegetable fats and oils, hereinafter described, possess the disadvantageous property of deteriorating before or after hydrogenation. This deterioration is characterized, particularly after hydrogenation and deodorization, by the development of an aromatic or grassy flavor or odor and is generally referred to as flavor and odor reversion.

The term "revertible oleaginous material" is used to designate those animal, marine, and vegetable fats and oils which undergo flavor reversion, for example, oleo oil, tallows, menhaden oil, sardine oil, whale oil, corn oil, linseed oil, Perilla oil, soya bean oil and the like.

To general procedures are employed in testing the reversion properties of revertible oleaginous materials. In the first of these procedures, a sample of fresh, bland deodorized material is heated to 200 degrees C. while exposed to the atmosphere. The material is then allowed to cool to about 120 degrees C. and the odor is observed. The material is then allowed to cool to about room temperature after which it is again heated to 200 degrees C. and the cooling, observation, and heating cycle repeated as often as desired. Generally, three cycles of heating and cooling are sufficient to cause reversion of a revertible oleaginous material. Soya bean oil, marine oils, tallow, deodorized hydrogenated soya bean oil, and deodorized hydrogenated marine oils generally revert in one heating and cooling cycle. In the second of these procedures, a sample of fresh, bland deodorized material is poured into an open container and the material exposed to air at room temperatures. Soya bean oil, marine oils, and tallows generally revert in from twelve hours to fifteen hours when tested according to the second procedure. Perilla, corn, and linseed oils generally required a longer period, which may be as high as several days in the case of certain specific samples.

In preparing edible products from crude revertible oleaginous materials, such as corn oil, linseed oil, Perilla oil, soya bean oil, menhaden oil, sardine oil, whale oil, and the like, the crude revertible oleaginous material is first refined with caustic to remove free fatty acids and other impurities. The refined material is then bleached with a solid decolorizing agent, such as fuller's earth, activated clay or carbon. The bleached material may then be subjected to hydrogenation followed by deodorization.

It is generally accepted that flavor and odor reversion is caused by oxidation of certain constituents of the edible fat or oil. We have discovered that this reversion is caused by the oxidation of impurities in the revertible oleaginous materials which are not part of the triglyceride molecule. These impurities are soluble in alcohol and insoluble in acetone.

For example, we have recrystallized hydrogenated soya bean oil from acetone twenty-five times and have found that such recrystallized product tended to revert to about the same extent as the original hydrogenated soya bean oil. Substantially completely hydrogenated soya bean oil converted to monoglycerides, then recrystallized from alcohol seven times and then reconverted to triglycerides by vacuum distillation exhibited a marked improvement with respect to reversion. Any appropriate solvent may be used in the recrystallization of the monoglycerides. From our investigations it is probable that the impurities which cause undesirable reversion are associated with the phosphatides. This probability is enhanced by the fact that when about 2 per cent mixed phophatides were incorporated into a sample of purified cottonseed oil and the mixture subsequently hydrogenated and deodorized, the resulting product reverted to much the same extent as ordinary hydrogenated soya bean oil. It is common knowledge that revertible oleaginous materials contain appreciable quantities of these phosphatides and related compounds.

We have discovered that we may prevent flavor and odor reversion in revertible oleaginous materials by freeing the material from those substances which cause reversion by a substantially complete decomposition, removal, or decomposition and removal of the reversion causing substances. The reversion causing substances include phosphorus and nitrogen containing compounds, for example, phosphatides, lecithins, cerebrosides, and the like.

Decomposition of the reversion causing substances may be effected by protecting the unsaturated bonds or linkages in glyceride molecules and destroying or decomposing these substances in the body of the oleaginous material by oxidation.

Removal of these materials on a small or laboratory scale may be effected by converting the triglycerides of the fat or oil to monoglycerides, recrystallizing in alcohol a number of times, and then reconverting the monoglycerides to triglycerides by vacuum distillation, as described in our paper published in volume 60 of the Journal of American Chemical Society, page 2603 (1938).

Decomposition and removal of these substances on a commercial scale may be effected by protecting the unsaturated bonds or linkages in the triglyceride molecule, destroying or decomposing these substances in the body of the revertible oleaginous material by oxidation, and removing the decomposition products of the oxidation reaction.

It will be appreciated that the method which involves only the removal of the reversion causing materials requires a considerable period of time and is relatively expensive at the present time.

In treating a vegetable oil, for example, soya bean oil, the oil is first subjected to the usual refining and bleaching steps. The refined oil is then substantially completely hydrogenated to a low iodine number. Hydrogenation may be effected by means well known to the art, for example, by passing hydrogen through the oil at a temperature of from 185 degrees C. to 210 degrees C. in the presence of a suitable catalyst, for example, nickel.

The impurities in the hydrogenated product which cause flavor and odor reversion are then destroyed or decomposed by oxidation. Oxidation may be effected by passing or blowing air through the body of the oil while maintaining the oil at an elevated temperature, for example, a temperature of from 95 degrees C. to 150 degrees C. The period required for oxidation is dependent upon the temperature at which the oxidation is carried out and also upon the quantity of air which is blown through the oil. In general, the time decreases with an increase in temperature and increase in the air blown through the oil. Oxidation may also be effected by various other oxidizing agents, examples of which are chlorine, chromic acid and its salts, and the like.

Complete hydrogenation of the revertible oleaginous material is not necessary prior to oxidation if a selective oxidizing agent is employed, namely, an oxidizing agent which will not oxidize the fat molecules at the double bonds, but will selectively oxidize the impurities present in the oil. Revertible oleaginous material which has been subjected to the action of an oxidizing agent, as described, will not revert. The presence of the oxidation products, however, imparts undesirable flavors and odors, and we, therefore, prefer to remove the products of oxidation.

The decomposition products formed during the oxidation period may be removed by a refining operation or a deodorizing operation or both. In the refining operation, the oxidized product is subjected to the action of caustic sode in a manner similar to the conventional caustic refining operation. Deodorization may be effected by heating the oil to a temperature of between 175 degrees C. and 235 degrees C. and treating the oil under a vacuum, for example, at an absolute pressure of from 2 mm. to 5 mm., with water vapor or steam.

The final product possesses exceptional properties with respect to odor and flavor reversion. We have found that soya bean oil which has been substantially completely hydrogenated, oxidized, and deodorized did not revert under any conditions to which the product was subjected and which ordinarily would cause reversion in a short period. Since it is impossible under commercial conditions to hydrogenate or protect all the double bonds or linkages in the glyceride molecules, certain peroxides are formed during the oxidation step, and rancidity develops in the product in the usual manner. The product may be stabilized against rancidity by any of the well known methods which include additional refining or the addition and incorporation in the product of antioxidants or stabilizing agents or both.

The following examples will serve to illustrate the practice of our invention as applied to various specific samples of revertible oleaginous material:

Example A

About 11 kilograms refined and bleached soya bean oil having an iodine number of about 130 and a refractive index at 60 degrees C. of 50.5 was employed as the starting material. Ten grams catalyst, consisting of finely divided nickel suspended in partially hydrogenated cottonseed oil, was added to the soya bean oil. The soya bean oil containing catalyst was then placed in a hydrogenation vessel and then heated under a vacuum and hydrogen introduced into the vessel until the pressure was about equal to atmospheric pressure. The oil employed to suspend the catalyst is not important; the particular substance employed was merely a convenient one. During the hydrogenation period the oil was vigorously agitated within the closed vessel in the presence of hydrogen. In carrying out the hydrogenation, additional ten gram quantities of the catalyst were added to the oil after forty minutes and after one hundred thirty minutes agitation in the presence of hydrogen. The following table represents the data which was obtained during the hydrogenation period:

| Minutes | Temperature | Pressure | Refractive index 60° C. |
|---|---|---|---|
| | °C. | #/sq. in. | |
| 0 | 185 | 15 | 50.5 |
| 30 | 200 | 15 | 41.1 |
| 40 | 200 | 15 | 40.0 |
| 70 | 205 | 15 | 34.6 |
| 130 | 200 | 15 | 32.3 |
| 160 | 200 | 15 | 32.2 |

The hydrogenated oil was then removed from the vessel and the catalyst removed by filtration. The iodine number of the oil had been reduced from 130 in the original refined and bleached oil to 13. The saponification number of the hydrogenated product was 190.0. The peroxide content was 0.

A sample of the deodorized hydrogenated product when subjected to both types of reversion tests reverted upon a single heating to 200 degrees C. and also upon exposure to air at room temperatures over night.

A sample of 500 grams of the hydrogenated soya bean oil, 250 grams of glycerol, and 5 grams of sodium hydroxide were thoroughly mixed and heated to the boiling point of glycerol and the mixture refluxed for fifteen minutes at the boiling point of glycerol. At the end of ten minutes, a clear fatty liquid appeared on the top of the mixture. After the heating period, the liquids were cooled and the excess glycerol was allowed to settle. The fatty layer, which consisted essentially of monoglycerides, was then separated from the glycerol layer. A second lot of hydrogenated soya bean oil was treated in the same manner and the monoglycerides combined with the monoglyceries prepared from the first lot of oil. The product of this reaction is but slightly soluble in ether, but it is quite soluble in alcohol.

The combined products of the reaction of the hydrogenated oil with glycerol were then dissolved in three liters of alcohol. A sufficient amount of sulphuric acid was added to the alcoholic solution to react with the added sodium hydroxide. Sodium sulphate was precipitated and filtered from the solution.

The alcoholic solution was then allowed to remain at room temperature over night, and the precipitate consisting essentially of crystallized monoglycerides was filtered from the solution. The filtrate was then cooled to about 2.5 degrees C. and maintained at this temperature for about four hours. A further precipitate of monoglycerides was formed and was removed by filtration. The filtrate was then cooled to —35 degrees C. and a further precipitate of monoglycerides was formed and removed from the solution. The three precipitates were then dissolved in 2.5 liters of alcohol, and the solution decolorized with activated carbon, specifically, the commercial product known as Norite.

The monoglycerides were then precipitated from the alcoholic solution at the same temperatures which were employed in the first crystallization and precipitation. The combined precipitate was then dissolved in 1200 cc. of alcohol, and the monoglycerides were again recrystallized. The precipitated monoglycerides were again dissolved in 1200 cc. of alcohol and the solution decolorized with activated carbon.

The monoglycerides were again redissolved and crystallized from alcohol in four additional recrystallization steps employing respectively 1200 cc., 1500 cc., 1400 cc., and 1200 cc. of alcohol. After the seventh crystallization, the precipitates consisting of purified monoglycerides were heated to about 200 degrees C. under an absolute pressure of about 2 mm. of mercury. The oil was maintained at this temperature and water vapor passed through the liquid monoglycerides for a period of about five hours. During the steam distillation, the monoglycerides were reconverted to triglycerides, the glycerin passing off as a vapor. The saponification number of the purified triglycerides was about 188.0.

A sample of the purified material was heated to about 205 degrees C. while exposed to the atmosphere and was then allowed to cool in accordance with the first of the procedures set forth above for testing the reversion properties of revertible oleaginous materials. Such treatment did not cause reversion of the product. A sample of the product exhibited no signs of reversion although it had been exposed to the atmosphere at room temperature and had been heated many times to a temperature of about 205 degrees C. over a period of about six months.

Example B

About 600 grams of the hydrogenated soya bean oil prepared according to Example A was placed in a one liter flask and the flask then placed in an oil bath maintained at a temperature of about 165 degrees C. About 0.1 to 0.2 gram of copper oxide was added to the oil. A rapid stream of air was then passed through the oil, the oil being at a temperature of about 150 degrees C., for a period of about two hours. The material was then allowed to cool to room temperature in the flask over night. The following morning the oil was again heated in the oil bath and air blown through the oil for about 7.5 hours. It was noticed that after about five hours total blowing time the characteristic hydrogenation odor was replaced by a sharp irritating odor which gradually became more piercing during the blowing treatment. At the same time that the sharp irritating odor replaced the hydrogenation odor, the color of the oil changed from the original yellowish orange color to a light yellow color. At the end of eight hours total blowing, the peroxide value had risen to 114 but the iodine number had been reduced to 11.9.

The oil was again allowed to cool to room temperature over night. On the following morning the oil was again heated and the blowing with air resumed and continued throughout the day. It was found that after about twelve hours total blowing time, the viscosity of the oil increased gradually with continued blowing. At the end of sixteen hours total blowing time, the peroxide value was 30 and the iodine number 6.8.

The blown product was then allowed to stand over a week-end and then deodorized at a temperature of about 200 degrees C. at 2 mm. pressure for five hours while passing water vapor through the oil.

A sample of the product was heated to 200 degrees C. and permitted to cool and again reheated and cooled but no reversion took place. This particular product was of a wax-like texture. A sample of the product exposed to the atmosphere for several months at room temperature showed no signs of reversion and only a faintly rancid odor could be detected when the product was heated.

Example C

A five pound quantity of hydrogenated soya bean oil prepared in a manner similar to that described in Example A and having an iodine number of 15 was subjected to an additional hydrogenation. The material was first melted and ten grams of nickel catalyst was added. The material was then transferred to the hydrogenation vessel and the oil vigorously agitated in the presence of hydrogen. At the end of ninety minutes an additional ten grams of catalyst was added and the agitation of the oil in the presence of hydrogen was continued. At the end of one hundred twenty minutes hydrogenation it was impossible to measure the refractive index of the hydrogenated product since the product solidified at a temperature above 60 degrees C. At the end of one hundred fifty minutes and two hundred twenty five minutes, additional quantities of ten grams of catalyst was added to the material. The following table represents the data which was obtained in this second hydrogenation step:

| Minutes | Temperature | Pressure | Refractive index 60° C. |
|---|---|---|---|
| | °C. | #/sq. in. | |
| 0 | 205 | 15 | 34.4 |
| 90 | 205 | 15 | 31.4 |
| 120 | 205 | 15 | |
| 225 | 205 | 15 | |
| 265 | 205 | 15 | |

After the hydrogenation period, the catalyst was removed by filtration. The total hydrogenation period, including the first step of Example A, for this particular oil sample was 425 minutes. The iodine number had been reduced from 15 to 1.8. The saponification number was 188.3. The highly saturated product was kept in a molten condition over night on a water bath. Although the oil was fairly light in color in the late afternoon, it had turned to a slight reddish color by the following morning.

The oil was then heated to about 150 degrees C. and a rapid stream of air passed through the heated material for seven hours. During the first forty-five minutes, the color of the oil was bleached. At the end of one hour and five minutes, the charatceristic hydrogenated odor was replaced by a strong irritating odor. During the next two hours, this odor became more pronounced. It will be noted that both the iodine number and the saponification number increased during this extended blowing period. The peroxide value first increased and then decreased quite rapidly during the last two hours of blowing. The table which follows sets forth the data which was obtained during this air blowing treatment:

| Time | Temperature of bath | Iodine Number | Saponification | Peroxides |
|---|---|---|---|---|
|  | °C. |  |  |  |
| 0 | 165 | 1.8 | 188.3 | 1.0 |
| 1 hr. 5 min | 167 | 1.7 | 189.3 | 20.0 |
| 2 | 167 | 1.6 | 190.1 | 26.0 |
| 3 | 170 | 1.7 | 192.1 | 29.0 |
| 4 | 172 | 2.1 | 194.0 | 29.0 |
| 5 | 170 | 2.4 | 195.9 | 30.0 |
| 6 | 170 | 2.8 | 196.8 | 24.0 |
| 7 | 170 | 3.1 | 196.8 | 16.0 |

The air blown product was not deodorized and was not tested for reversion directly but was used in other experimental work.

A sample of soya bean oil, however, hydrogenated according to this example to an iodine number of 1.5 was heated to about 150 degrees C. and a rapid stream of air passed through the heated product for about three hours. The air blown product was then deodorized at about 200 degrees C. at 3 mm. pressure for five hours during which period water vapor was continuously passed through the melted material. The final product had a reddish color but did not revert under the test conditions outlined above.

Example D

A 300 gram sample of hydrogenated soya bean oil prepared in accordance with Example C and having an iodine number of 1.7 was placed in a flask and heated to about 80 degrees C. An aqueous solution containing 20 cc. to 25 cc. water and 3 grams of sodium dichromate was added to the heated oil. The oil and aqueous solution were agitated and about 4 cc. concentrated sulphuric acid was added slowly. The mixture was then agitated for fifteen minutes, the temperature maintained between about 80 degrees C. and 90 degrees C. The temperature was then raised to about 125 degrees C. and a stream of air passed through the liquid for about five minutes to remove the water.

The resulting dried liquid material was quite dark in color, and the material was bleached by treatment with a mixture of activated carbon and fuller's earth. The product was then deodorized at 200 degrees C. at 3 mm. pressure for five hours while passing water vapor through the melted material during this period. The final product had an excellent color, and a sample exhibited no signs of reversion after exposure to the atmosphere at room temperature for three and one-half months. Hydrogenated soya bean oil having an iodine number of 1.7 after deodorization will revert on a single heating of the oil in air to a temperature of about 200 degrees C.

Example E

A sample of menhaden oil having an iodine number of 170 was treated in a manner similar to that described in Example B. Twenty-two hundred grams of menhaden oil and 10 grams of catalyst were thoroughly mixed and placed in a hydrogenation vessel. Additional quantities of 10 grams of catalyst were added at the end of one hundred twenty minutes and two hundred forty minutes. The following table represents the data obtained during the hydrogenation of this sample:

| Minutes | Temperature | Pressure | Refractive index 60° C. |
|---|---|---|---|
|  | °C. | #/sq. in. |  |
| 0 | 196 | 17 | 61.4 |
| 30 | 205 | 17 | 50.4 |
| 60 | 201 | 17 | 45.2 |
| 120 | 212 | 17 | 40.2 |
| 180 | 213 | 17 | 35.5 |
| 240 | 215 | 17 | 33.5 |
| 305 | 217 | 17 | 32.5 |
| 330 | 210 | 17 | 32.3 |

After the hydrogenation period, the catalyst was removed by filtration. The iodine number had been reduced to 3.0.

Five hundred grams of the hydrogenated product was heated to about 150 degrees C. and a rapid stream of air passed through the heated liquid for about five hours. The blown material was then allowed to stand in the laboratory over a week-end and was then deodorized at about 200 degrees C. at 3 mm. pressure for five hours with water vapor passing continuously through the liquid product. The deodorized product was bland and showed no signs of reversion after exposure to the atmosphere at room temperature for about three and one-half months. Hydrogenated deodorized menhaden oil reverts in about nine days.

Our process may be carried out on unrefined and unbleached revertible oleaginous materials, however, we prefer to first refine and bleach the oil or fat. In protecting the unsaturated bonds of the glyceride molecules present in the oleaginous material, the presence of the impurities ordinarily removed by refining and bleaching necessitates a longer hydrogenation period. In some cases, the free fatty acids present poison the catalyst employed in hydrogenation and render hydrogenation to a low iodine number exceedingly difficult.

In the subsequent oxidation step, the presence of impurities ordinarily removed by refining and bleaching is undesirable. These impurities include natural antioxidants and must first be oxidized before it is possible to secure the desired oxidation of the reversion causing substances. Unrefined and unbleached materials require longer oxidation periods.

It will be appreciated that oxidation may be effected in the presence of moisture, either water or water vapor. Oxidation may also be effected during a portion of the deodorization process, for example, a stream of air and steam may be passed through the oleaginous material and the air supply may be discontinued prior to the completion of the deodorization period.

In the claims, the term "oil" is employed in a generic sense to include both oils and fats.

It is apparent that our invention may be applied to prevent odor reversion of revertible oleaginous materials which are intended for inedible uses.

We claim:
1. The method of preventing reversion of revertible oleaginous materials which comprises subjecting the oleaginous material to the action of hydrogen under conditions such as to affect sufficient hydrogenation to protect the unsaturated bonds of the glyceride molecules, subjecting the hydrogenated product to the action of an oxidizing agent to destroy the revertible materials, and removing the end products of oxidation.

2. The method of preventing reversion of revertible oleaginous materials which comprises subjecting the oleaginous material to catalytic hydrogenation under conditions such as to affect substantially complete hydrogenation of unsaturated glycerides, subjecting the hydrogenated product to the action of an oxidizing agent to destroy the revertible materials, and deodorizing the resulting product.

3. The method of preventing reversion of revertible oleaginous materials which comprises substantially completely hydrogenating the oleaginous material, subjecting the hydrogenated product at elevated temperatures to the action of air whereby oxidation of revertible materials occurs, and deodorizing the resulting product.

4. The method of preventing reversion of revertible oleaginous materials which comprises hydrogenating the oleaginous material to an iodine number below 15, passing a stream of air through the hydrogenated oleaginous material at a temperature of from 95 degrees C. to 150 degrees C. for sufficient time to substantially destroy revertible materials, and thereafter passing steam through the oil at a temperature of from 175 degrees C. to 235 degrees C. under a vacuum.

5. The method of preventing reversion of refined revertible vegetable oils which comprises subjecting the oil to the action of hydrogen under conditions such as to affect sufficient hydrogenation to protect the unsaturated bonds of the glyceride molecules, subjecting the hydrogenated product to the action of an oxidizing agent whereby the revertible materials are decomposed, and removing the end products of oxidation.

6. The method of preventing reversion of refined revertible vegetable oils which comprises substantially completely hydrogenating the vegetable oil, subjecting the hydrogenated product at elevated temperatures to the action of air whereby the revertible materials are oxidized, and deodorizing the resulting product.

7. The method of preventing reversion of refined corn oil which comprises substantially completely hydrogenating the oil, subjecting the hydrogenated product at elevated temperatures to the action of air whereby the revertible materials are oxidized, and deodorizing the resulting product.

8. The method of preventing reversion of refined soya bean oil which comprises substantially completely hydrogenating the oil, subjecting the hydrogenated product at elevated temperatures to the action of air whereby the revertible materials are oxidized, and deodorizing the resulting product.

9. The method of treating refined soya bean oil which comprises hydrogenating the oil at a temperature between 185 degrees C. and 210 degrees C. in the presence of finely divided nickel for sufficient time to hydrogenate the oil sufficiently to protect the double bonds of the glyceride molecules, removing the nickel from the oil, oxidizing the revertible materials by passing a stream of air through the hydrogenated material at a temperature between 95 degrees C. and 150 degrees C., and removing the oxidation products by passing steam through the hydrogenated and oxidized material at a temperature between 175 degrees C. and 235 degrees C. under an absolute pressure of between 2 mm. and 5 mm. of mercury.

10. The method of treating refined soya bean oil which comprises adding to the oil finely divided nickel, subjecting the oil to the action of hydrogen for 425 minutes at a temperature between 185 degrees C. and 210 degrees C., removing the nickel from the hydrogenated product, passing a stream of air through the hydrogenated product at a temperature of 150 degrees C. for 7 hours, and passing steam through the hydrogenated and oxidized product at a temperature of 200 degrees C. under an absolute pressure of 3 mm. of mercury for 5 hours.

11. The method of treating refined soya bean oil which comprises adding finely divided nickel to the oil, subjecting the oil to the action of hydrogen for 425 minutes at a temperature between 185 degrees C. and 210 degrees C., removing the nickel from the hydrogenated product, adding an aqueous solution of sodium dichromate and sulphuric acid to the hydrogenated product at a temperature between 80 degrees C. and 90 degrees C., agitating the mixture of hydrogenated product and aqueous solutions, heating the mixture to a temperature of about 125 degrees C. and passing steam through the hydrogenated product for 5 minutes, heating the product to 200 degrees C., and passing steam through the product for 5 hours while maintaining the product under an absolute pressure of 3 mm. of mercury.

12. The method of preventing reversion of revertible marine oils which comprises subjecting the oil to the action of hydrogen under conditions such as to affect sufficient hydrogenation of the oil to protect the unsaturated bonds of the glyceride molecules, subjecting the hydrogenated product to the action of an oxidizing agent whereby the revertible materials are oxidized, and removing the end products of oxidation.

13. The method of preventing reversion of refined revertible marine oils which comprises substantially completely hydrogenating the marine oil, subjecting the hydrogenated product at elevated temperatures to the action of air whereby the revertible materials are oxidized, and deodorizing the resulting product.

14. The method of preventing reversion of refined menhaden oil which comprises substantially completely hydrogenating the oil, subjecting the hydrogenated product at elevated temperatures to the action of air whereby the revertible materials are oxidized, and deodorizing the resulting product.

15. The method of treating refined menhaden oil which comprises adding to the oil finely divided nickel, subjecting the oil to the action of hydrogen for 330 minutes at a temperature between 198 degrees C. and 217 degrees C., removing the nickel from the hydrogenated product, passing a stream of air through the hydrogenated product at a temperature of 150 degrees C. for 5 hours, and passing steam through the product at a temperature of 200 degrees C. under an absolute pressure of 3 mm. of mercury for 5 hours.

HARLAND H. YOUNG.
HOWARD C. BLACK.